| United States Patent [19] | [11] Patent Number: 4,808,075 |
|---|---|
| Pariani et al. | [45] Date of Patent: Feb. 28, 1989 |

[54] HELICOPTER ROTOR

[75] Inventors: Emilio Pariani, Cardano al Campo; Vittorio Caramaschi, Gallarate; Pierluigi Castelli, Busto Arsizio, all of Italy

[73] Assignee: Costruzioni Aeronautiche Giovanni Agusta S.p.A., Italy

[21] Appl. No.: 123,605

[22] Filed: Nov. 20, 1987

[30] Foreign Application Priority Data

Nov. 25, 1986 [IT] Italy ................. 67876 A/86

[51] Int. Cl.$^4$ ............................................. B64C 27/38
[52] U.S. Cl. .................................. 416/140; 416/106; 416/134 A
[58] Field of Search .......... 416/140 A, 141 R, 138 A, 416/134 A, 114, 106, 107

[56] References Cited

U.S. PATENT DOCUMENTS

| 2,815,821 | 12/1957 | Echeverria | 416/106 |
|---|---|---|---|
| 4,342,540 | 8/1982 | Lovera et al. | 416/140 A |
| 4,361,415 | 11/1982 | Aubry | 416/140 A X |
| 4,369,019 | 1/1983 | Lovera et al. | 416/134 A |
| 4,512,717 | 4/1985 | Pancotti et al. | 416/134 A |
| 4,516,909 | 5/1985 | Caramaschi et al. | 416/134 A |
| 4,549,851 | 10/1985 | Pariani | 416/140 A |
| 4,551,067 | 11/1985 | Caramaschi et al. | 416/140 A |
| 4,652,211 | 3/1987 | Castelli et al. | 416/140 A |

*Primary Examiner*—Everette A. Powell, Jr.
*Attorney, Agent, or Firm*—Kane, Dalsimer, Sullivan, Kurucz, Levy, Eisele and Richard

[57] ABSTRACT

A helicopter rotor on which each blade is connected in articulated manner to a center hub by means of a fork, the vertical plane movement of which is limited, below a given speed of the rotor, by a pair of limit rocker arms located between the hub and a ring nut mounted for rotation on the fork and angularly integral with the hub by means of a rod of variable length connected in articulated manner to a slide supported on the hub and arranged substantially horizontally and crosswise in relation to the blade.

8 Claims, 4 Drawing Sheets

HELICOPTER ROTOR

BACKGROUND OF THE INVENTION

The present invention relates to a helicopter rotor. In particular, the present invention relates to an articulated rotor on which each blade is connected to the center hub on the rotor by means of a fork, in turn, connected in articlated manner to the said hub.

On articulated rotors of the aforementioned type, each blade oscillates, in relation to the hub and about the said articulated joint, both vertically in a plane perpendicular to that of the hub, due to lift, and horizontally in the hub plane, due to inertia and drag.

Known rotors of the aforementioned type usually present limiting devices for maintaining vertical and horizontal oscillation within relatively limited angles, below a given rotor speed.

In particular, the said limiting devices are known to comprise rocker arms mounted on the said fork or hub and designed to move, by virtue of centrifugal force, between a normal idle position, wherein the said rocker arms cooperate with contact surfaces on the said hub or fork, for limiting the said oscillation, and a working position wherein the blade is free to oscillate.

The main drawback of articulated rotors featuring limiting devices of the aforementioned type is that the said articulated joint connecting the fork and hub allows the blade, not only to oscillate vertically and horizontally, but also to perform a pitch-change rotation about its own axis, which obviously results in displacement of the said contact surfaces and the paths of the respective rocker arms. The effect of such displacement is to impair contact between the said rocker arms and respective contact surfaces, which inevitably increases wear and impairs the efficiency of the said limiting devices.

This is extremely dangerous as far as vertical oscillation control is concerned, in that, whereas horizontal oscillation is kept under control by means of hydraulic dampers between the blade and hub, low-speed vertical oscillation is generally controlled solely by the said rocker arms. Consequently, any impairment in the efficiency of the said rocker arms may, especially during take-off, and due to both wind and the well known "ground effect", result in sharp pitching of the blades and overturning of the helicopter.

SUMMARY OF THE INVENTION

The aim of the present invention is to provide a rotor designed, at least as regards the vertical oscillation limiting device, to ensure perfect contact at all times between the rocker arms and respective contact surfaces, regardless of the blade pitch.

With this aim in view, according to the present invention, there is provided an articulated helicopter rotor comprising a drive shaft; a center hub fitted on to the said drive shaft; a number of blades extending substantially radially from the said hub and connected in articulated manner to the same; and a device for limiting oscillation of each blade in relation to the said hub and substantially parallel with the axis of the said drive shaft; characterised by the fact that, for each said blade, the said limiting device comprises a ring nut supported on the said blade in such a manner as to turn about its own axis parallel with the axis of the said blade; a drive extending between the said ring nut and the said hub, for rendering the same integral as regards rotation about the said ring nut axis, the said drive comprising a variable-length element and an articulated joint; and rocker arm means located between the said hub and the said ring nut, and designed to turn in a plane substantially parallel with the axis of the said drive shaft.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
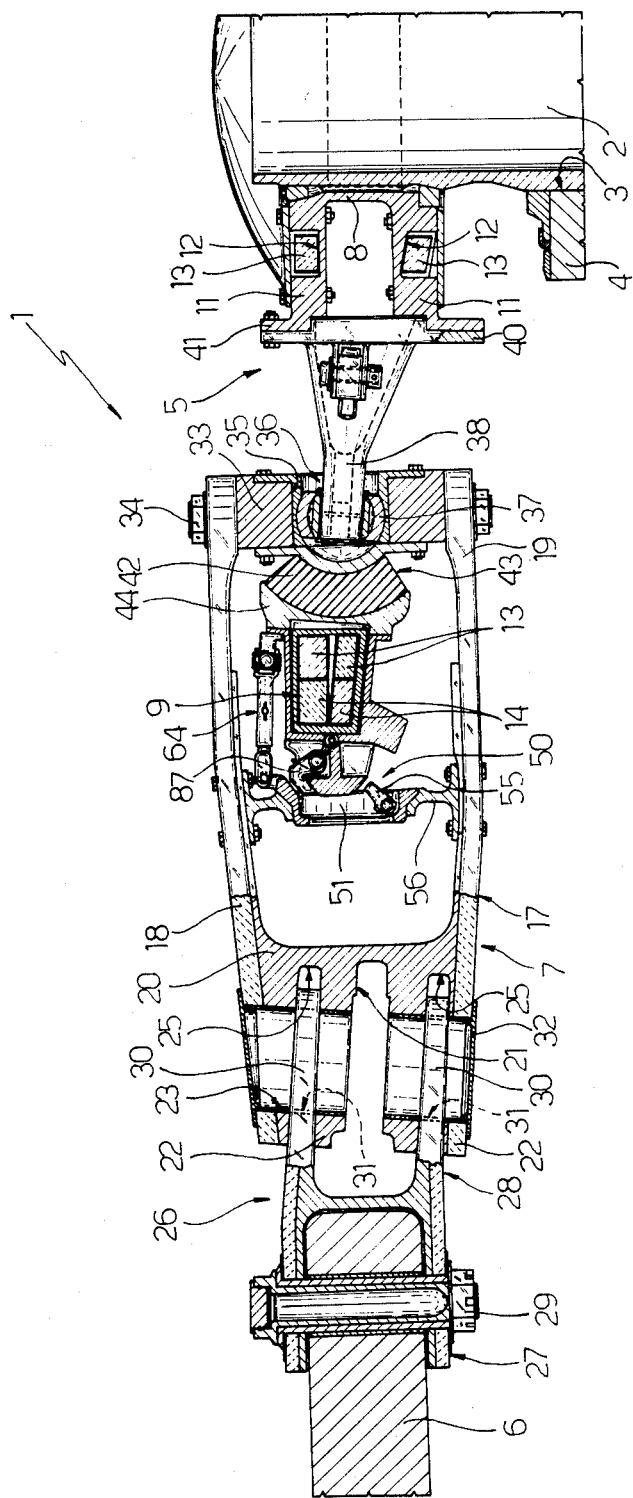
FIG. 1 shows a schematic axial section of a preferred embodiment of a rotor in accordance with the teachings of the present invention.

Number 1 in FIG. 1 indicates a main helicopter rotor comprising a substantially vertical drive shaft 2, the top end of which comes out through a hole 3 formed in the fuselage 4 of the helicopter.

Rotor 1 also comprises a hub 5 coaxial with, and fitted on to the said top end of, shaft 2; and a number of blades 6 (only one of which is shown) extending outwards and substantially radially from hub 5, and each connected to the same by means of a respective connecting device 7.

Hub 5 comprises an inner tubular body 8 preferably made of metal, and fitted on to shaft 2; an outer frame 9 preferably made of composite material, and having a horizontal section (not shown) substantially in the form of a regular polygon with rounded tips equal in number to the said blades 6; and a number of annular blend elements 10, each located between tubular body 8 and a respective rounded tip on the said frame 9.

On its top and bottom ends, tubular body 8 presents two annular flanges 11, each of which presents a number of grooves 12 (only one of which is shown) and houses a portion of an annular strip 13 of composite material having a substantially rectangular section. Each strip 13 on top flange 11 is arranged facing a similar strip 13 on bottom flange 11, and the strips in each said pair of opposite strips 13 are integral with each other, so as to form a respective annular element 10, as well as with the adjacent annular elements 10 and frame 9. The said frame 9 also consists of two superimposed strips 14, which are rendered integral with strips 13 of each annular element 10 by means of a composite material jacket 15, so as to define, on each rounded tip of frame 9, a bridge structure 16 connected to connecting device 7 of respective blade 6.

Each connecting device 7 comprises a substantially U-shaped fork 17 mounted with its concave side facing shaft 2. The said fork 17 comprises a top arm 18 and a bottom arm 19 rendered integral, at the inner end, by a root element 20 which, on the side facing outwards, presents a substantially horizontal slot 21 defining, on element 20 itself, two superimposed arms 22 facing radially outwards in relation to shaft 2. Arms 22 present two axial through holes 23 (only one of which is shown), and each present a slot 25 substantially parallel with slot 21.

Each connecting device 7 also comprises an adapter 26 consisting of two superimposed forks 27 and 28. The said fork 27 houses the root of a respective blade 6, which is secured to the arms of fork 27 by means of two through bolts 29 (only one of which is shown). The said fork 28 comprises two superimposed arms 30, each engaged in rotary and axially-sliding manner inside a respective slot 25, and each having a hole 31 coaxial with one of holes 23.

The said hole 23 and coaxial hole 31 are fitted through with a pin 32, whereas the other hole 23 (not shown) houses a motor (not shown) cooperating in known manner with a drive (not shown) in such a manner as to turn respective blade 6 about the axis of the motor, after first removing pin 32.

Adapter 26 and the said motor (not shown) provide, in known manner, for folding respective blade 6 along fuselage 4, for enabling the helicopter to be stowed in confined spaces, such as inside a ship.

Each connecting device 7 is connected to respective bridge structure 16 by means of a wall 33 extending through the center opening of respective annular element 10 and connected to the free inner ends of respective arms 18 and 19 by means of two through bolts 34 (only one of which is shown).

The said wall 33 presents a center hole 35 extending substantially radially in relation to shaft 2 and housing a spherical joint 36, the rotula 37 of which is mounted on the free end of an appendix 38 having, on the other end, a flange 40. The said flange 40 is connected to a flange 41 located in a plane substantially parallel with the axis of shaft 2, and integral with the outer edge of flange 11.

Wall 33 is connected in known manner (not shown) to a pitch-change control device (not shown), and is provided laterally, in known manner, with contact surfaces (not shown) designed to cooperate in known manner with the ends of respective rocker arms (not shown) mounted on appendix 38, for limiting displacement of respective blade 6 in a substantially horizontal plane perpendicular to the axis of shaft 2.

The surface of wall 33 facing respective root element 20 is connected to the inner shoe 42 of an elastomeric bearing 43, the outer shoe 44 of which is arranged substantially contacting respective bridge structure 16, and is connected, by means of screws 45 on its top and bottom ends, to the free ends of two arms 46 and 47 of a U-shaped bracket 48 fitted on to the said bridge structure 16 with its concave side facing shaft 2, and with its own root element 49, joining arms 46 and 47, arranged contacting the outer surface of bridge structure 16.

Between each bracket 48 and fork 17 of respective connecting device 7, there is provided a device 50 for limiting oscillation of blade 6 in relation to hub 5 in a substantially vertical plane parallel with the axis of shaft 2.

Figure 2:
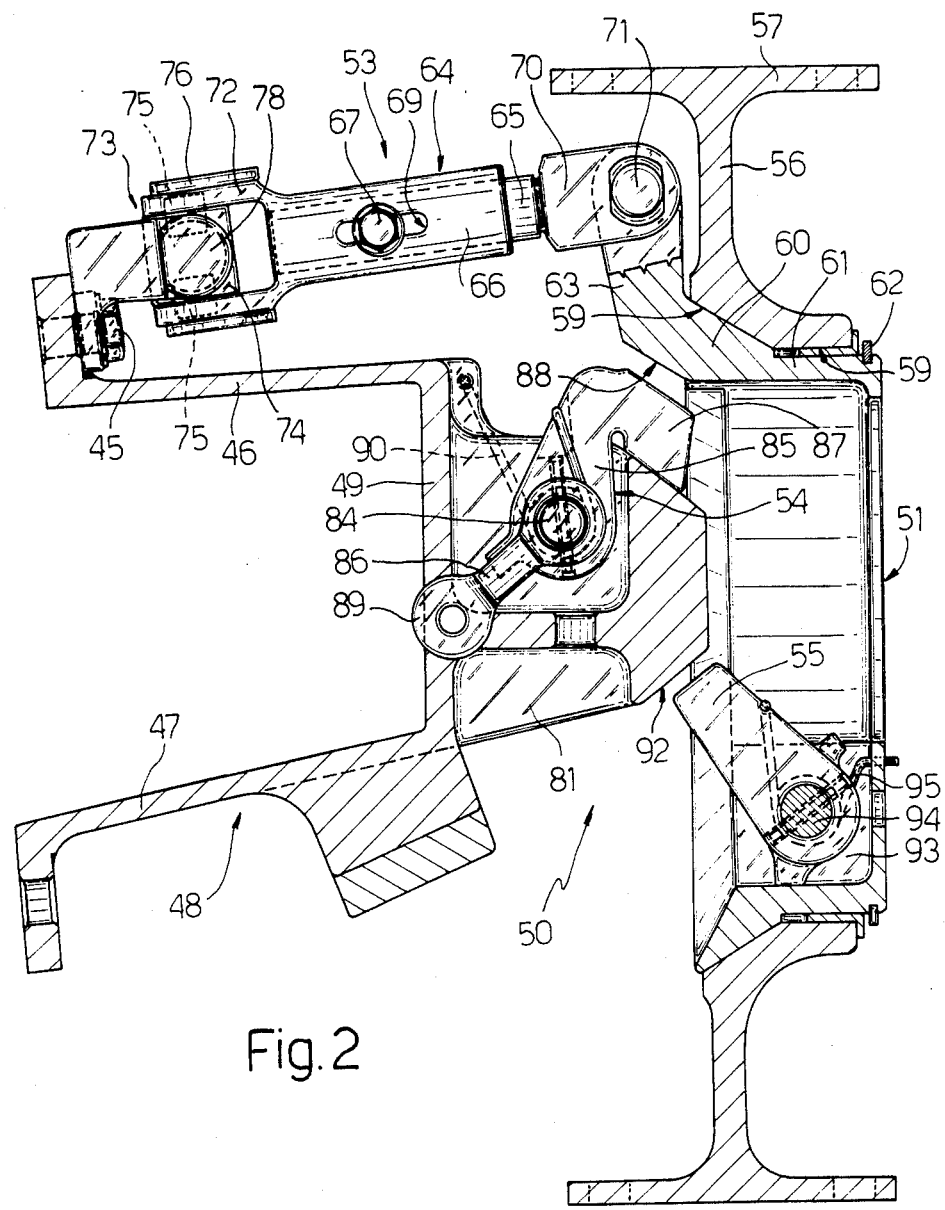
FIG. 2 shows a larger-scale section of a detail in FIG. 1.
Figure 3:
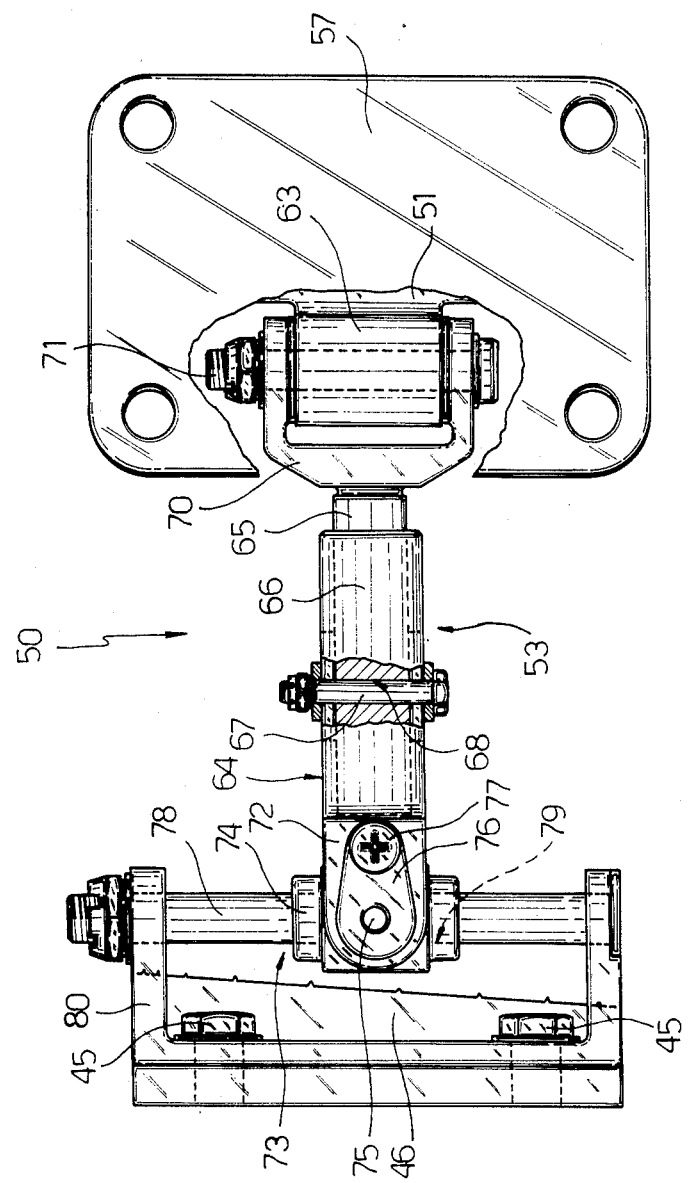
FIG. 3 shows a plan view of the FIG. 2 detail.

As shown, particularly in FIGS. 2 and 3, limiting device 50 comprises a ring nut 51 having its axis substantially parallel with that of respective blade 6. Ring nut 51 is mounted on fork 17 in such a manner as to turn about its own axis, and is angularly fixed in relation to hub 5. Also forming an integral part of limiting device 50 are bracket 48, which is locked on to respective bridge structure 16 and connected to ring nut 51 by means of an articulated drive 53; and two rocker arms 54 and 55 designed to turn in a plane substantially parallel with the axis of shaft 2, and located between bracket 48 and ring nut 51 for respectively limiting downward and upward displacement of ring nut 51 in relation to bracket 48 below a given speed of rotor 1.

In more detail, between arms 18 and 19 of each fork 17, there extends a transverse wall 56 having flanges 57 on its opposite ends, for connecting it to the said arms 18 and 19. Wall 56 is located in a plane substantially perpendicular to the axis of respective appendix 38, and presents a center through hole 58, the surface of which defines a conical annular seat 59 flaring in the direction of shaft 2. Seat 59 constitutes a supporting and sliding seat for ring nut 51, the outer surface of which comprises a truncated-cone portion 60 contacting seat 59, and a cylindrical portion 61 extending from the small end of portion 60 towards respective blade 6 and through hole 58.

Ring nut 51 is secured axially inside hole 58 by means of a retaining ring 62, and presents, on the side facing hub 5, an appendix 63 extending outwards substantially radially, for connection to drive 53.

As shown in FIGS. 2 and 3, drive 53 lies in a substantially radial plane in relation to hub 5, and comprises a variable-length telescopic rod 64 consisting of a solid cylindrical-section rod 65 mounted in sliding manner inside a hollow rod 66 and secured to the same in angularly-fixed and axially-sliding manner by means of a diametrical through bolt 67, which engages a diametrical through hole 68 formed through rod 65, and is designed to slide along two axial slots 69 formed in rod 66.

The end of rod 65 facing ring nut 51 is connected integral with a fork 70 engaged by appendix 63 and hinged to the same by means of a pin consisting of a bolt 71 arranged substantially horizontally and perpendicular to the axis of ring nut 51.

The end of rod 66 facing hub 5, and opposite the end engaged by rod 65, is connected to a fork 72 of a universal joint 73 comprising, in addition to fork 72, a bush 74 having a substantially square outer section and which is mounted inside fork 72 and engaged by two coaxial pins 75 perpendicular to bolt 71. As shown in FIG. 2, each pin 75 extends through a respective hole formed through a respective arm of fork 72, and is supported by a respective plate 76 which, as shown in FIG. 3, is connected integral with the outer surface of the said arm by means of a lock screw 77.

The said bush 74 constitutes a slide mounted in rotary and axially-sliding manner on a straight guide fixed in relation to hub 5 and consisting of rod 78. Bush 74 presents a cylindrical axial through hole 79 perpendicular to pins 75 and engaged in sliding and rotary manner by rod 78, which is also cylindrical and the ends of which are connected to bracket 48 via the interposition of a U-shaped bracket 80 rendered integral with bracket 48 by some of screws 45.

Figure 4:
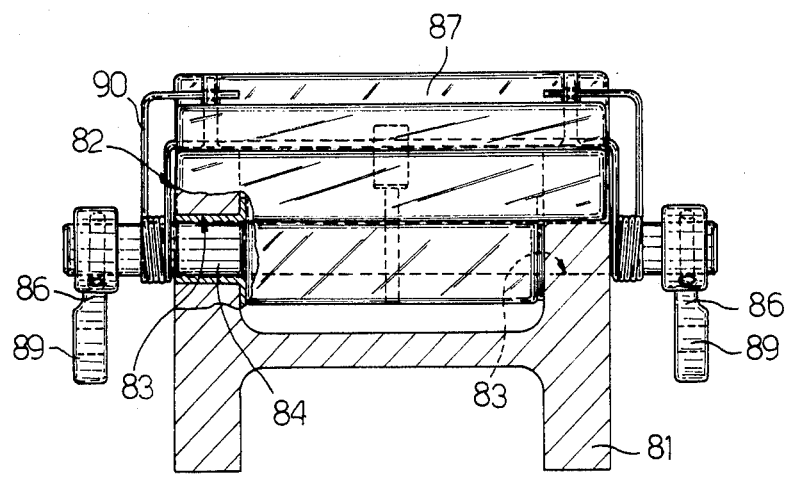
FIGS. 4 and 5 show elevations of two details in FIGS. 2 and 3.

As shown, particularly in FIGS. 2 and 4, root element 49 of bracket 48 presents, on the side facing respective blade 6, a nose 81 defining a fork 82 (FIG. 4) having two through holes 83 engaged by a pin 84, the opposite ends of which project from hole 83 and are fitted respectively with a first arm 85 and a second arm 86 of rocker arm 54. The said first arm 85 is located at the top, and comprises a head 87 designed to cooperate with a supporting surface 88 formed on ring nut 51 for supporting, when idle, respective blade 6 on hub 5, and to move in the direction of shaft 2 and clear of the said surface 88, subsequent to rotation of rocker arm 54 by a counterweight 89 connected to the end of bottom arm 86, when rotor 1 exceeds a given preset speed. The said rocker arm 54 is rotated against the action of a spring 90, the center portion of which is wound about pin 84, and the ends of which respectively engage nose 81 and head 87, for pushing head 87 downwards and into contact with the outer surface of nose 81.

At the bottom, nose 81 presents a supporting surface 92 designed to cooperate with rocker arm 55, for limiting, when idle, upward displacement of respective blade 6.

Figure 5:
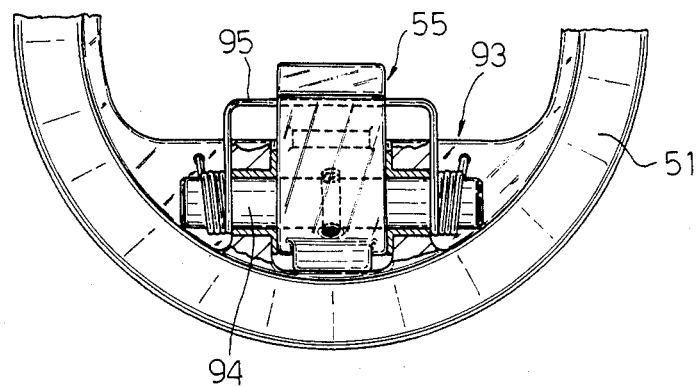

As shown in FIG. 5, on the side facing hub 5, ring nut 51 presents a bottom fork 93 to which rocker arm 55 is connected in rotary manner via the interposition of a pin 94 and return spring 95.

In actual use, any rotation of blade 6 and, consequently, of respective fork 17 about their axes, subsequent to a pitch change of blade 6, results in mutual rotation of ring nut 51 and respective supporting wall 56, the said wall 56 turning in relation to ring nut 51, which is maintained angularly fixed in relation to bracket 48 by drive 53.

In other words, therefore, the only mutual movements between each ring nut 51 and respective bracket 48 are two oscillating movements, the first of which, in a plane perpendicular to the axis of shaft 2, in no way affects the perfect juxtaposition of rocker arms 54 and 55 and respective supporting surfaces 88 and 92, due to the size of the said surfaces perpendicular to the FIG. 2 plane. As for the second of the said oscillating movements, this takes place in a plane parallel with the axis of shaft 2 and, below a given speed of rotor 1, is limited by rocker arms 54 and 55, which, due to the absence of any angular displacement between ring nut 51 and bracket 48, are maintained permanently and perfectly facing respective supporting surfaces 88 and 92.

We claim:

1. An articulated helicopter rotor comprising a drive shaft; a center hub fitted on to the said drive shaft; a number of blades extending substantially radially from the said hub and connected in articulated manner to the same; and a device for limiting oscillation of each blade in relation to the said hub and substantially parallel with the axis of the said drive shaft; characterised by the fact that, for each said blade, the said limiting device comprises a ring nut supported on the said blade in such a manner as to turn about its own axis parallel with the axis of the said blade; a drive extending between the said ring nut and the said hub, for rendering the same integral as regards rotation about the said ring nut axis, the said drive comprising a variable-length element and an articulated joint; and rocker arm means located between the said hub and the said ring nut, and designed to turn in a plane substantially parallel with the axis of the said drive shaft.

2. A rotor as claimed in claim 1, characterised by the fact that each said blade is connected to the said center hub by means of a fork comprising two arms arranged respectively over and underneath the said center hub; the said ring nut being arranged between, and supported by, the said two arms.

3. A rotor as claimed in claim 2, characterised by the fact that each said fork comprises a wall extending between the said two arms and crosswise in relation to the axis of the respective said blade; the said transverse wall having a conical center seat facing the said hub; and the said ring nut having a conical annular surface locked axially contacting the said conical seat and cooperating in rotary manner with the same.

4. A rotor as claimed in claim 1,
    characterised by the fact that, for each said blade, the said drive also comprises a guide mounted on the said hub, substantially crosswise in relation to the axis of the respective said blade, and a slide mounted so as to slide along the said guide; the said slide being connected to one end of the said variable-length element by means of the said articulated joint.

5. A rotor as claimed in claim 4, characterised by the fact that the said articulated joint is a universal joint.

6. A rotor as claimed in claim 4, characterised by the fact that the said guide comprises a straight, cylindrical-section rod, and the said slide comprises a cylindrical bush connected in rotary and axially-sliding manner to the said rod; the said articulated joint comprising a fork connected to one end of the said variable-length element, and the said bush being hinged to the said fork in such a manner as to turn in relation to the same about an axis perpendicular to the longitudinal axis of both the said bush and the said variable-length element.

7. A rotor as claimed in claim 1,
    characterised by the fact that each said variable-length element comprises a telescopic rod comprising two elements connected in axially-sliding and angularly-fixed manner.

8. A rotor as claimed in claim 1,
    characterised by the fact that the said rocker arm means comprise at least one rocker arm supported in rotary manner on the said hub; the said ring nut having a contact surface for an end surface on the said rocker arm.

* * * * *